United States Patent
Ringeisen

(10) Patent No.: US 8,417,484 B2
(45) Date of Patent: Apr. 9, 2013

(54) METHOD AND DEVICE FOR MONITORING AN INTERCOOLER BYPASS VALVE

(75) Inventor: Marc Ringeisen, Gaeufelden (DE)

(73) Assignee: Robert Bosch GmbH, Stuttgart (DE)

( * ) Notice: Subject to any disclaimer, the term of this patent is extended or adjusted under 35 U.S.C. 154(b) by 426 days.

(21) Appl. No.: 12/774,783

(22) Filed: May 6, 2010

(65) Prior Publication Data

US 2010/0286960 A1   Nov. 11, 2010

(30) Foreign Application Priority Data

May 7, 2009   (DE) .......................... 10 2009 002890

(51) Int. Cl.
G06F 11/30   (2006.01)
G06F 19/00   (2011.01)

(52) U.S. Cl.
USPC ...... 702/183; 73/114.01; 73/865.8; 73/865.9; 340/679; 700/299; 702/34; 702/189

(58) Field of Classification Search ............... 73/114.01, 73/865.8, 865.9; 137/551; 340/500, 540, 340/679; 431/18; 700/90, 299; 701/1, 31.6, 701/31.8, 99, 101; 702/1, 33, 34, 127, 182, 702/183, 187, 189

See application file for complete search history.

(56) References Cited

U.S. PATENT DOCUMENTS

| 2,754,186 | A  | * | 7/1956  | Ensign .......................... 48/184 |
| 3,321,613 | A  | * | 5/1967  | Searle ........................... 702/182 |
| 6,701,232 | B2 | * | 3/2004  | Yamaki ......................... 701/33.8 |
| 7,631,552 | B2 | * | 12/2009 | Keski-Hynnila et al. .. 73/114.74 |
| 2002/0022899 | A1 | * | 2/2002  | Deby ............................ 700/100 |
| 2002/0161495 | A1 | * | 10/2002 | Yamaki ........................... 701/33 |
| 2008/0148827 | A1 | * | 6/2008  | Keski-Hynnila et al. .. 73/114.31 |

FOREIGN PATENT DOCUMENTS

DE   102009002890 A1 * 11/2010

* cited by examiner

Primary Examiner — Edward Cosimano
(74) Attorney, Agent, or Firm — Kenyon & Kenyon LLP

(57) ABSTRACT

A method for diagnosing a bypass valve in a bypass line for an intercooler in a supercharger for an internal combustion engine, including the following steps: ascertaining a value of an efficiency of the intercooler as the reference efficiency; actuating the bypass valve to open the bypass valve; ascertaining a value of a further efficiency of the intercooler as the diagnosis efficiency after actuating the bypass valve to open; and detecting a malfunction of the bypass valve when the absolute value of the deviation between the reference efficiency and the diagnosis efficiency is less than a specified threshold value.

11 Claims, 3 Drawing Sheets

METHOD AND DEVICE FOR MONITORING AN INTERCOOLER BYPASS VALVE

CROSS REFERENCE

The present application claims the benefit under 35 U.S.C. §119 of German Patent Application No. 102009002890.0 filed on May 7, 2009, which is expressly incorporated herein by reference in its entirety.

FIELD OF THE INVENTION

The present invention relates to an intercooler for supercharged internal combustion engines, in particular a method for checking the functionality of a bypass valve situated in a bypass line which bypasses the intercooler.

BACKGROUND INFORMATION

In supercharged internal combustion engines, compressed air is provided to the cylinders via an appropriate air feed system. The air is compressed with the aid of supercharging devices such as turbochargers, for example. When the air is compressed, it is heated, which without further measures would result in reduced efficiency of the combustion of an air-fuel mixture which is produced using this heated compressed air. To increase the efficiency of the combustion, the charge air which is heated by the compression of the ambient air may be cooled with the aid of a so-called intercooler.

In particular for an internal combustion engine which is cold, i.e., in its start-up phase, cooling of the charge air is not advantageous because it delays the heating of the internal combustion engine to its operating temperature. However, rapid heating of the internal combustion engine to operating temperature is desirable for reducing harmful emissions. For this reason intercoolers are generally provided with a bypass line in which a bypass valve is situated. The bypass valve is actuated in such a way that when the internal combustion engine is cold (i.e., a short time after the internal combustion engine is started in the cold state), the valve is opened to divert the compressed intake air around the intercooler, thus avoiding cooling. As a result, the internal combustion engine is heated more rapidly. If the internal combustion engine is at operating temperature, the bypass valve is closed, and therefore the intake air is completely led through the intercooler. Depending on the operating state, intermediate positions of the bypass valve may also be provided, depending on the design of the engine system.

To detect impairment of the operation of the internal combustion engine, which increases harmful emissions, as the result of a stuck bypass valve, an onboard diagnosis system may be implemented which actuates the bypass valve when certain enabling conditions are present, so that the valve closes and reopens for a specified period of time, during which the temperature behind the intercooler, i.e., downstream from the intercooler, is monitored. For both time periods a temperature gradient is generated, and is checked for plausibility in order to detect proper or improper functioning of the bypass valve.

For enabling the onboard diagnosis, previous diagnoses must show that the sensors and actuators used are not defective, and that a specified operating point is maintained. The operating point may be a function of the engine rotational speed, injection quantity, ambient temperature, instantaneous air mass, charge pressure, vehicle speed, and the engine operating mode. Plausibility checking is carried out by generating an average temperature gradient based on the difference between the initial and final temperatures downstream from the intercooler during the particular time period, and comparing the absolute value to a threshold value. If the gradient is too small, the bypass valve is recognized as defective.

Depending on the operating state, when diagnosis is enabled in the steady state, under some circumstances a temperature gradient downstream from the intercooler when the bypass valve is open or closed cannot build up, so that a bypass valve stuck in a position cannot be detected in this manner.

If the diagnostic conditions are set in such a way that the enabling takes place in the dynamic case (for example, for a high charge pressure and large injection quantities), a temperature gradient may be determined only when the enabling conditions last for a sufficient length of time. However, since in the dynamic case the charge pressure and the injection quantity may change rapidly, the diagnosis may possibly be terminated before the entire sequence of opening and closing of the bypass valve and computing the resulting temperature gradients is completed. Therefore, it cannot be ensured that the diagnosis of the bypass valve for the intercooler is carried out within a normal driving cycle, since it is possible that enabling conditions may not be met for a sufficient contiguous period of time during the entire operating period.

SUMMARY

An object of the present invention is to provide a method for diagnosing an intercooler in which a diagnosis is ensured within a normal driving cycle, and in which a stuck bypass valve may be detected in a short period of time.

This object may be achieved with the aid of example methods according to the present invention for diagnosing a bypass valve for an intercooler in a supercharged internal combustion engine, and corresponding example devices.

According to a first aspect, an example method is provided for diagnosing a bypass valve in a bypass line for an intercooler of a supercharger for an internal combustion engine. The example method includes the following steps
- ascertaining a value of an efficiency of the intercooler as the reference efficiency;
- actuating the bypass valve to open the bypass valve;
- ascertaining a value of a further efficiency of the intercooler as the diagnosis efficiency after actuating the bypass valve to open;
- detecting a malfunction of the bypass valve when it is determined that the absolute value of the deviation between the reference efficiency and the diagnosis efficiency is less than a specified threshold value.

According to a further aspect, an example method is provided for diagnosing a bypass valve in a bypass line of an intercooler in a supercharger for an internal combustion engine. The example method includes the following steps:
- regulating the bypass valve according to a specified setpoint temperature of charge air downstream from the intercooler;
- actuating the bypass valve to open the bypass valve;
- determining a control deviation based on the actual temperature of the charge air downstream from the intercooler and the setpoint temperature of the charge air downstream from the intercooler;
- detecting a malfunction if the absolute value of the control deviation is less than a specified threshold value after the actuation to open the bypass valve.

One aspect of the present invention is to provide methods which allow the intercooler to be diagnosed in dynamic operation of the internal combustion engine. This may be achieved by changing the opening state of the bypass valve and subsequently measuring and evaluating a parameter. According to the above example methods, the parameter corresponds to a deviation in a control of the bypass valve or a deviation in a value of an efficiency of the intercooler. These example methods have the advantage that a malfunction of the bypass valve may be quickly detected, since a complicated determination of a temperature gradient downstream from the intercooler during a diagnostic period is not necessary.

In addition, the particular value of the efficiency may be determined using information concerning a temperature of the charge air downstream from the intercooler and a temperature of the charge air upstream from the intercooler. Alternatively, the particular value of the efficiency may be determined as an area defined by a graph over a specified period of time, the graph indicating the variation over time of a difference between a temperature of the charge air downstream from the intercooler and a temperature of the charge air upstream from the intercooler.

In particular, the bypass valve may be actuated to open when one or more enabling conditions are met. In this manner, it may be ensured that the diagnosis of the intercooler bypass valve is enabled only for dynamic driving conditions, since only in this state is it possible to reliably detect the absence of a significant increase in the temperature downstream from the intercooler when a bypass valve is stuck in the closed position.

The enabling condition may include one or more of the following conditions:

The difference between the temperature upstream from the intercooler and the temperature downstream from the intercooler exceeds a specified threshold value;
the bypass valve is completely closed;
The control value for the bypass valve is within a defined value range;
the load torque is greater than a specified load torque threshold value;
the engine rotational speed is greater than a specified engine rotational speed threshold value;
the vehicle speed is greater than a specified speed threshold value;
the ambient temperature is higher than a specified ambient temperature threshold value;
the ambient pressure is greater than a specified ambient pressure threshold value;
the battery voltage is greater than a specified battery voltage threshold value;
the engine temperature is higher than a specified engine temperature threshold value;
a desired operating mode of the internal combustion engine is present;
the air mass flow is within a specified air mass flow value range;
the charge pressure downstream from the intercooler was greater, at least once, than a specified charge pressure threshold value for a specified period of time, in particular after the most recent engine start-up.

If the malfunction is detected by evaluating the difference in the control deviation, it may be provided that the bypass valve is actuated to open only when a temperature upstream from the intercooler exceeds a first threshold value, fluctuations in the setpoint temperature during a predetermined period of time are less than a predetermined absolute value, and the absolute value of the control deviation is less than a predetermined control deviation threshold value.

It is also possible to determine as a malfunction a bypass valve which is stuck in the closed state or a clogged bypass line which connects an inlet side and an outlet side of the intercooler.

According to a further aspect, an example device is provided for diagnosing a bypass valve in a bypass line of an intercooler in a supercharger for an internal combustion engine. The example device includes a control unit
to ascertain a value of an efficiency of the intercooler as the reference efficiency;
to actuate the bypass valve to open the bypass valve;
to ascertain a value of a further efficiency of the intercooler as the diagnosis efficiency after actuating the bypass valve to open;
to detect a malfunction of the bypass valve when the deviation between the reference efficiency and the diagnosis efficiency is less than a specified threshold value.

According to a further aspect, an example device is provided for diagnosing a bypass valve in a bypass line of an intercooler in a supercharger for an internal combustion engine. The example device includes a control unit
to control the bypass valve according to a specified setpoint temperature of charge air downstream from the intercooler;
to actuate the bypass valve to open the bypass valve;
to determine a control deviation based on the actual temperature of the charge air downstream from the intercooler and the setpoint temperature of the charge air downstream from the intercooler; and
to detect a malfunction when the absolute value of the control deviation is less than a specified threshold value after the bypass valve is actuated to open.

According to a further aspect, an example computer program is provided for a control device in a motor vehicle in order to carry out the above example methods.

BRIEF DESCRIPTION OF THE DRAWINGS

Preferred specific example embodiments are explained in greater detail below with reference to the figures.

DETAILED DESCRIPTION OF EXAMPLE EMBODIMENTS

Figure 1:
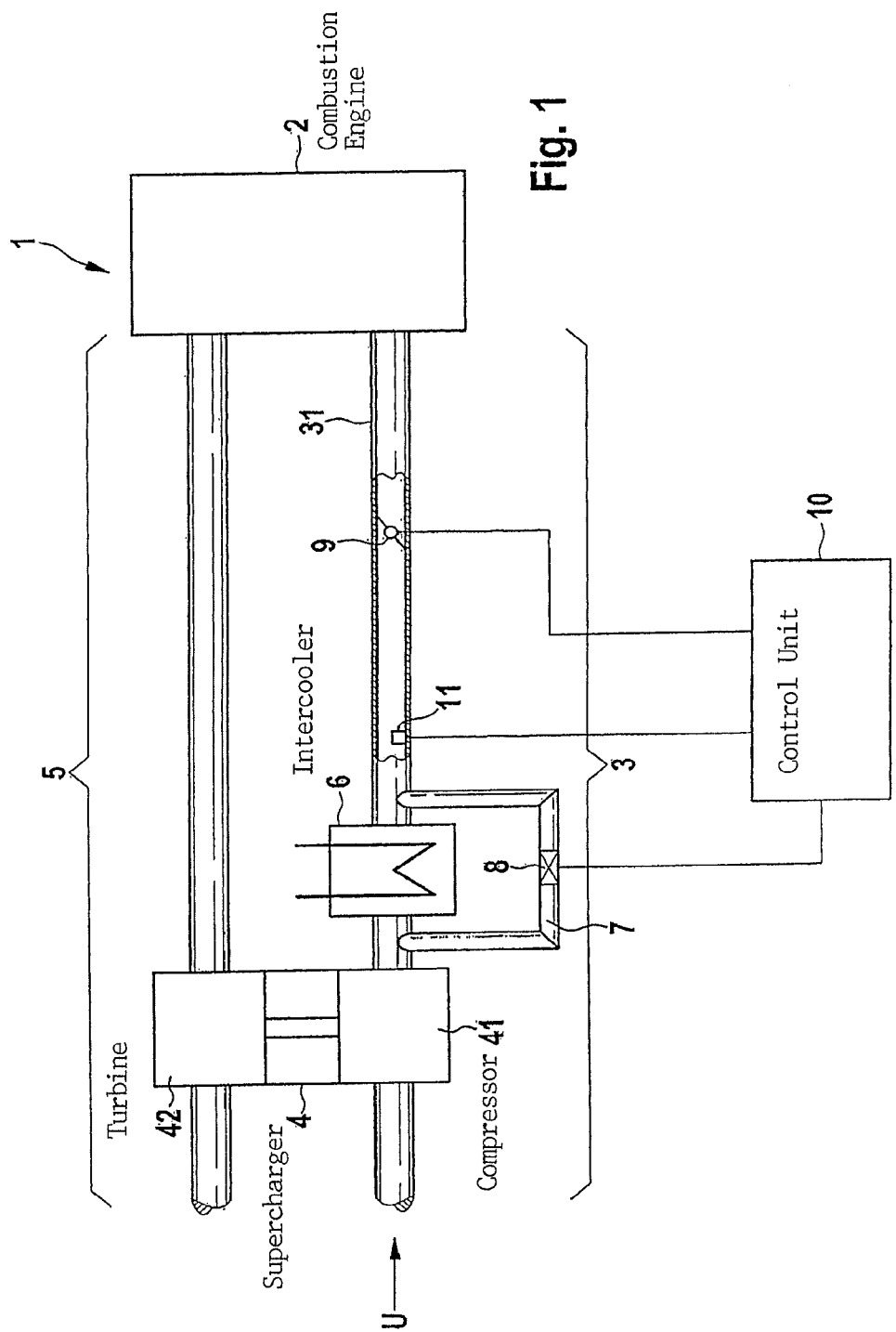
FIG. 1 shows a schematic illustration of an engine system having a supercharged internal combustion engine and an intercooler.

FIG. 1 shows a schematic illustration of an engine system 1, having an internal combustion engine 2 which is supplied with air via an air feed system 3. A supercharger 4 is situated in air feed system 3, and with the aid of a compressor 41 draws in air from surroundings U and provides the air in compressed form to internal combustion engine 2 via an intake manifold section 31. Fuel is supplied to intake manifold section 31 or directly to the cylinders to produce an air-fuel mixture.

Supercharger 4 is connected to an exhaust gas discharge system 5, so that a turbine 42 for supercharger 4 is driven by the exhaust gas enthalpy of exhaust gas discharge system 5.

To increase the efficiency of internal combustion engine 2, it is meaningful for the air which is heated by the compression to be cooled before supplying it to internal combustion engine 2. For this purpose an intercooler is usually provided downstream from supercharger 4, the intercooler cooling the compressed air as it passes through. Intercooler 6 may be designed as a conventional heat exchanger, for example, to cool the heated compressed air to ambient temperature.

For certain operating states of engine system 1 it may be meaningful to not cool, or only partially cool, the air which is compressed by supercharger 4. This is provided in particular as long as internal combustion engine 2 is in cold operating mode, and the quickest possible heating of internal combustion engine 2 is sought in order to achieve operation which optimizes emissions. For this purpose, a bypass line 7 runs around intercooler 6, the bypass line containing a bypass valve 8, and diverting or not diverting the charge air provided by supercharger 4 around intercooler 6, depending on the opening state of the bypass valve. In cold operating mode of internal combustion engine 2 it is therefore provided that bypass valve 8 is completely open, so that the charge air is cooled as little as possible. In warm operating mode, as a rule bypass valve 8 is completely closed, or, for a variable-control bypass valve, is only partially opened according to charge air temperature control, so that the charge air completely or partially flows through intercooler 6, where it is appropriately cooled.

A throttle valve 9 is provided downstream from intercooler 6 and controls the air feed to internal combustion engine 2. Throttle valve 9 is adjusted by a control unit 10 which adjusts throttle valve 9 as a function of the driver's input and other engine operating variables. Control unit 10 is also connected to a temperature sensor 11 situated in air feed system 3 in order to measure the temperature of the charge air downstream from intercooler 6. Control unit 10 is also connected to bypass valve 8 in order to adjust the bypass valve. Control unit 10 may control the temperature downstream from intercooler 6 according to a specified setpoint value for the temperature downstream from intercooler 6. The resulting manipulated variable is used for actuating bypass valve 8.

Figure 2:
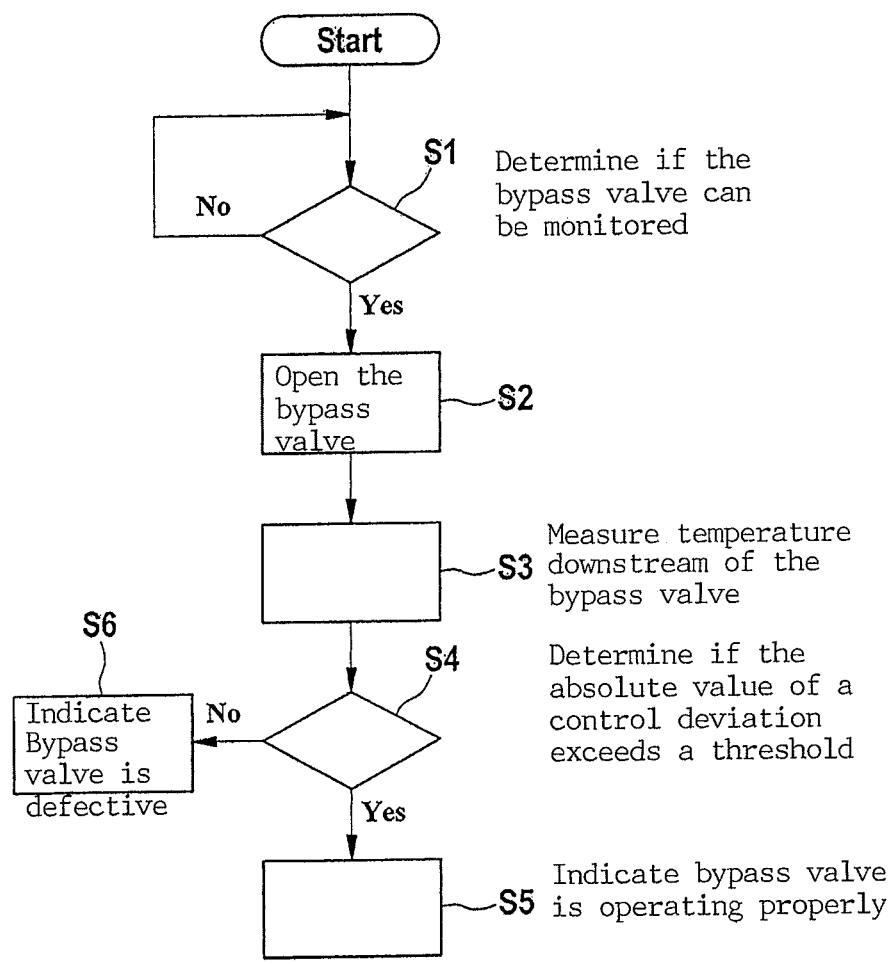
FIG. 2 shows a flow chart for illustrating an example method for diagnosing the functionality of the bypass valve according to one specific example embodiment.

FIG. 2 shows a flow chart for illustrating the example method, carried out in control unit 10, for diagnosing the functionality of bypass valve 8 of an intercooler 6. In step S1 a check is made as to whether an operating state is achieved in which the functionality of bypass valve 8 may be monitored. For this purpose, a check is made to determine whether one or more enabling conditions are present. As mentioned above, it may be provided that bypass valve 8 functions only in a dynamic operating state, since only in a dynamic operating state is it possible to reliably detect the absence of a significant increase in the temperature downstream from the intercooler when bypass valve 8 is stuck in the closed position. Therefore, in step S1 a check may be made as to whether the temperature upstream from the intercooler is higher than a temperature threshold value. The temperature upstream from the intercooler is modeled based on the operating state of the engine system. The modeling takes into account the temperature of the ambient air and the efficiency of compressor 41. The efficiency of the compressor is a function of the mass flow and the compression ratio across compressor 41.

A further enabling condition checked in step S1 is that the setpoint value of the temperature downstream from intercooler 8 is constant or does not change by more than a predetermined rate of change.

A further enabling condition may be that the absolute value of the control deviation between the setpoint value of the temperature downstream from intercooler 6 and the actual value of the temperature downstream from intercooler 6 is less than a specified control deviation threshold value.

The enabling conditions may also include one or more of the following conditions:
the difference between the temperature upstream from the intercooler (modeled temperature as a function of the ambient temperature and compressor efficiency) and the temperature downstream from the intercooler (measured) exceeds a specified threshold value;
bypass valve 8 is completely closed, or the control value of the bypass valve is within a defined value range;
the load torque and/or engine rotational speed are greater than a particular specified threshold value;
the vehicle speed is greater than a specified speed threshold value;
the ambient temperature is higher than a specified ambient temperature threshold value;
the ambient pressure is greater than a specified ambient pressure threshold value;
the battery voltage is greater than a specified battery voltage threshold value;
the engine temperature is higher than a specified engine temperature threshold value;
a desired operating mode of the internal combustion engine is present;
the air mass flow is within a specified value range;
the charge pressure downstream from the intercooler was greater, at least once, than a specified charge pressure threshold value for a specified period of time, to ensure that the air feed system is in a predetermined state.

Only when the selected enabling conditions in step S1 have been met (alternative: yes) is bypass valve 8 actuated to open in step S2, so that when the bypass valve is operating properly it is partially or completely open. The control deviation between the setpoint value of the temperature downstream from intercooler 6 and the actual value of the temperature downstream from intercooler 6, which is measured with the aid of temperature sensor 11, is determined (step S3), and the resulting control deviation is compared to a specified control deviation threshold value to determine whether the absolute value of the control deviation exceeds a specified control deviation threshold value (step S4). If this is the case (alternative: yes), it is concluded that bypass valve 8 is operating properly, i.e., is not stuck in the closed state. Similar information may be provided according to step S5. If it is determined that the value is less than the control deviation threshold value (alternative: no), it may be concluded that bypass valve 8 is defective, or that bypass line 7 is clogged. Similar information may be provided according to step S6.

To rule out interfering influences, the detection may be debounced to a value which is less than the control deviation threshold value by determining the control deviation in multiple computing cycles and comparing it to the corresponding control deviation threshold value. A conclusion regarding a malfunction of bypass valve 8 is not drawn until a value has been determined which is less than the control deviation threshold value in a given proportion of the computing cycles.

Figure 3:
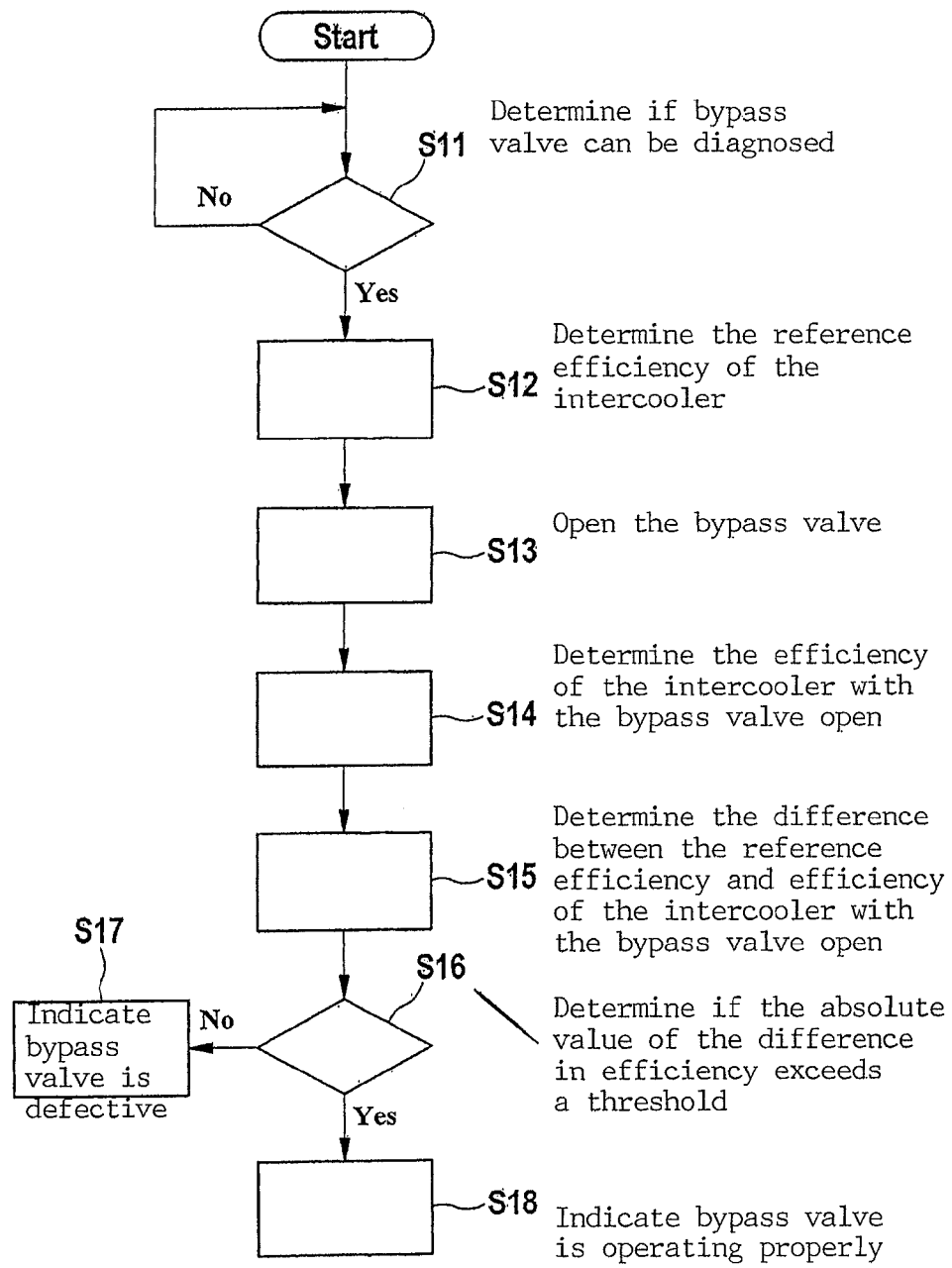
FIG. 3 shows a flow chart of an example method for diagnosing the functionality of a bypass valve for an intercooler according to a further specific embodiment.

FIG. 3 illustrates a flow chart for diagnosing the functionality of bypass valve 8 according to a further specific embodiment. In step S11 a check is made as to whether one or more enabling conditions are met in order to carry out the diagnosis of the bypass valve 8 for intercooler 6. The enabling conditions essentially correspond to those for the method in FIG. 2.

If the enabling conditions are met (alternative: yes), in a step S12 the average efficiency of intercooler 6 over a specified period of time is computed as a reference efficiency $\eta_{ref}$. The following formula is used for computing the efficiency:

$$\eta = (T20 - T21)/(T20 - T0),$$

where T20 is the temperature upstream from the intercooler, T21 is the temperature downstream from the intercooler, T0 is the ambient temperature, and η is the efficiency. The average efficiency is computed by forming the average value from multiple measurements at different points in time. When the reference measurement in step S12 has ended, control unit 10 actuates bypass valve 8 to open it (step S13). After the actuation for opening bypass valve 8, in a step S14 efficiency η is recomputed according to the above formula, and is averaged over a time period which is the same or comparable.

In a step S15 the difference between reference efficiency $\eta_{ref}$ determined in step S12 and average efficiency η computed for open bypass valve 8 is determined.

In step S16 it is determined whether the absolute value of the difference in efficiency is less than a specified threshold value (alternative: no). In this case bypass valve 8 is malfunctioning; i.e., it is stuck in the closed state. Similar information may be provided according to step S17. If it is determined in step S16 that the absolute value of the difference in efficiency between reference efficiency $\eta_{ref}$ and average efficiency η when bypass valve 8 is open is greater than the threshold value, it is concluded that bypass valve 8 was properly open. Similar information may be provided according to step S18.

The presence of the enabling conditions may be checked multiple times or continuously during steps S12 through S15. As soon as these enabling conditions are no longer met, the computations at that time are terminated and a recomputation takes place, starting with the reference measurement, as soon as the enabling conditions are once again met in step S11.

To rule out interfering influences, the determination of the difference in efficiency may be debounced by determining the difference in efficiency in multiple computing cycles and comparing it to the corresponding threshold value. A conclusion regarding a malfunction of bypass valve 8 is not drawn until a value has been determined which is less than the threshold value in a given proportion of the computing cycles.

As an alternative to the computation of the average efficiency for reference efficiency $\eta_{ref}$ and efficiency η when the bypass valve is open, the geometric area defined over a specified time between temperature T20 upstream from the intercooler and temperature T21 downstream from the intercooler may be computed. The following formula is used for this purpose:

$$FL=\Sigma(T20-T21)dT,$$

where dT is the time increment in which the computation is carried out. Similarly as for the above method, the area computation represents information concerning efficiency η of intercooler 6, so that the threshold value comparison may be used to draw conclusions regarding the functionality of bypass valve 8.

What is claimed is:

1. A method for diagnosing a bypass valve in a bypass line for an intercooler in a supercharger for an internal combustion engine, comprising:
    ascertaining a value of an efficiency of the intercooler as a reference efficiency;
    actuating the bypass valve to open the bypass valve;
    ascertaining a value of a further efficiency of the intercooler as a diagnosis efficiency after actuating the bypass valve to open; and
    detecting a malfunction of the bypass valve when an absolute value of a deviation between the reference efficiency and the diagnosis efficiency is less than a specified threshold value.

2. The method as recited in claim 1, wherein a particular value of the efficiency is determined using information concerning a temperature of the charge air downstream from the intercooler and a temperature of the charge air upstream from the intercooler.

3. The method as recited in claim 1, wherein a particular value of the efficiency is determined as an area defined by a graph over a specified period of time, the graph indicating a variation over time of a difference between a temperature of charge air downstream from the intercooler and a temperature of the charge air upstream from the intercooler.

4. The method as recited in claim 1, wherein the bypass valve is actuated to open when at least one enabling condition is met.

5. The method as recited in claim 4, wherein the at least one enabling condition includes at least one of the following monitored conditions:
    a difference between a temperature upstream from the intercooler and a temperature downstream from the intercooler exceeds a specified threshold value;
    the bypass valve is completely closed;
    a control value for the bypass valve is within a defined value range;
    a load torque is greater than a specified load torque threshold value;
    an engine rotational speed is greater than a specified engine rotational speed threshold value;
    a vehicle speed is greater than a specified speed threshold value;
    an ambient temperature is higher than a specified ambient temperature threshold value;
    an ambient pressure is greater than a specified ambient pressure threshold value;
    a battery voltage is greater than a specified battery voltage threshold value;
    an engine temperature is higher than a specified engine temperature threshold value;
    a desired operating mode of the internal combustion engine is present;
    an air mass flow is within a specified air mass flow value range; and
    a charge pressure downstream from the intercooler was greater, at least once, than a specified charge pressure threshold value for a specified period of time, after a most recent engine start-up.

6. A method for diagnosing a bypass valve in a bypass line of an intercooler in a supercharger for an internal combustion engine, comprising:
    regulating the bypass valve according to a specified setpoint temperature of charge air downstream from the intercooler;
    actuating the bypass valve to open the bypass valve;
    determining a control deviation based on an actual temperature of a charge air downstream from the intercooler and a setpoint temperature of the charge air downstream from the intercooler; and
    detecting a malfunction if an absolute value of the control deviation is less than a specified threshold value after an actuation to open the bypass valve.

7. The method as recited in claim 6, wherein the bypass valve is actuated to open when a monitored temperature upstream from the intercooler exceeds a first threshold value, monitored fluctuations in the setpoint temperature during a predetermined period of time are less than a predetermined absolute value, and a monitored absolute value of the control deviation is less than a predetermined control deviation threshold value.

8. The method as recited in claim 7, wherein a bypass valve which is stuck in a closed state or a clogged bypass line which connects an inlet side and an outlet side of the intercooler is determined as a malfunction.

9. A device for diagnosing a bypass valve in a bypass line of an intercooler in a supercharger for an internal combustion engine, the device comprising:
 a control unit adapted to ascertain a value of an efficiency of the intercooler as the reference efficiency, actuate the bypass valve to open the bypass valve, ascertain a value of a further efficiency of the intercooler as a diagnosis efficiency after actuating the bypass valve to open, and detect a malfunction of the bypass valve when an absolute value of a deviation between the reference efficiency and the diagnosis efficiency is less than a specified threshold value.

10. A device for diagnosing a bypass valve in a bypass line of an intercooler in a supercharger for an internal combustion engine, comprising:
 a control unit adapted to control the bypass valve according to a specified setpoint temperature of charge air downstream from the intercooler, actuate the bypass valve to open the bypass valve, determine a control deviation based on an actual temperature of the charge air downstream from the intercooler and the setpoint temperature of the charge air downstream from the intercooler, and detect a malfunction when an absolute value of the control deviation is less than a specified threshold value after the bypass valve is actuated to open.

11. A memory device storing a computer program, the computer program, when executed by a control unit, causing the control unit to perform the steps of:
 ascertaining a value of an efficiency of an intercooler in a supercharger for an internal combustion engine as a reference efficiency;
 actuating a bypass valve in a bypass line for the intercooler to open the bypass valve;
 ascertaining a value of a further efficiency of the intercooler as a diagnosis efficiency after actuating the bypass valve to open; and
 detecting a malfunction of the bypass valve when an absolute valve of a deviation between the reference efficiency and the diagnosis efficiency is less than a specified threshold value.

* * * * *